United States Patent
Le Ny et al.

(10) Patent No.: US 10,577,271 B2
(45) Date of Patent: Mar. 3, 2020

(54) OVERPRESSURE-ASSISTED GRAVITY BENDING METHOD AND DEVICE SUITABLE THEREFOR

(71) Applicant: SAINT-GOBAIN GLASS FRANCE, Courbevoie (FR)

(72) Inventors: Jean-Marie Le Ny, Gemmenich (BE); Michael Balduin, Alsdorf (DE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 20 days.

(21) Appl. No.: 15/578,699

(22) PCT Filed: Aug. 26, 2016

(86) PCT No.: PCT/EP2016/070140
§ 371 (c)(1),
(2) Date: Nov. 30, 2017

(87) PCT Pub. No.: WO2017/042037
PCT Pub. Date: Mar. 16, 2017

(65) Prior Publication Data
US 2018/0179099 A1    Jun. 28, 2018

(30) Foreign Application Priority Data

Sep. 8, 2015 (EP) .................................... 15184166

(51) Int. Cl.
   *C03B 23/035*   (2006.01)
   *C03B 23/025*   (2006.01)
(52) U.S. Cl.
   CPC ...... *C03B 23/0355* (2013.01); *C03B 23/0256* (2013.01)

(58) Field of Classification Search
   CPC ............ C03B 23/0305; C03B 23/0355; C03B 23/0256
   See application file for complete search history.

(56) References Cited

U.S. PATENT DOCUMENTS

| 3,114,571 A | 12/1963 | Carson et al. |
| 3,473,909 A | 10/1969 | Bennett et al. |

(Continued)

FOREIGN PATENT DOCUMENTS

| CA | 2861707 A1 | 9/2013 |
| CN | 1130600 A | 9/1996 |

(Continued)

OTHER PUBLICATIONS

International Preliminary Report on Patentability for International Application No. PCT/EP2016/070140 filed Aug. 26, 2016 on behalf of Saint-Gobain Glass France, dated Mar. 13, 2018. 11 pages.

(Continued)

*Primary Examiner* — Jodi C Franklin
*Assistant Examiner* — Andrés E. Behrens, Jr.
(74) *Attorney, Agent, or Firm* — Steinfl + Bruno LLP

(57) ABSTRACT

The present invention relates to a device and method for bending at least one glass pane. The device includes: a gravity bending mould with a supporting surface, which is suitable for arranging at least one glass pane thereon; an upper shaping tool arranged opposite the supporting surface, the upper shaping tool being suitable for producing an overpressure on a surface of the at least one glass pane arranged on the supporting surface, and the surface of the at least one glass pane faces away from the supporting surface. The shaping tool has a cover that forms a hollow space open in the direction of the gravity bending mould and is equipped with a sealing lip arranged on an edge section of the cover for making contact with the surface of the at least one glass (Continued)

Figure 3:
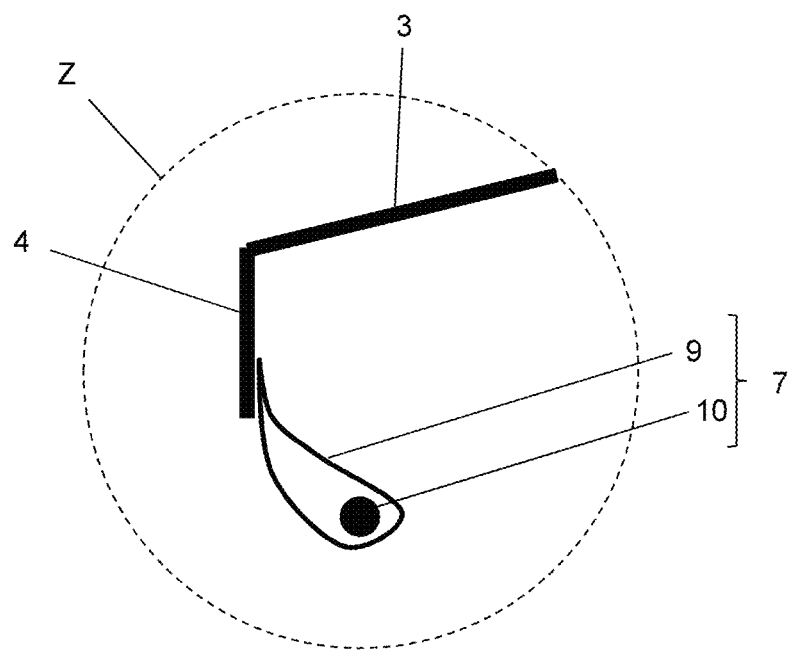

pane, and the shaping tool is equipped with means for introducing a gas into the hollow space in order to produce the overpressure.

20 Claims, 3 Drawing Sheets

(56) References Cited

U.S. PATENT DOCUMENTS

| | | | |
|---|---|---|---|
| 3,778,244 A | 12/1973 | Nedelec et al. | |
| 4,115,090 A | 9/1978 | Comperatore | |
| 4,229,199 A | 10/1980 | Seymour et al. | |
| 4,233,050 A * | 11/1980 | Comperatore | C03B 23/0258 65/104 |
| 4,504,109 A | 3/1985 | Taga et al. | |
| 4,507,547 A | 3/1985 | Taga et al. | |
| 4,511,386 A | 4/1985 | Kellar et al. | |
| 4,666,492 A * | 5/1987 | Thimons | C03B 23/0302 294/65 |
| 4,678,495 A | 7/1987 | Yoshizawa et al. | |
| 4,709,988 A | 12/1987 | Kai et al. | |
| 4,738,704 A | 4/1988 | Vanaschen et al. | |
| 4,764,196 A | 8/1988 | Boutier et al. | |
| 4,877,437 A | 10/1989 | Nitschke | |
| 4,910,088 A | 3/1990 | Baudin et al. | |
| 4,952,227 A | 8/1990 | Herrington et al. | |
| 5,057,265 A | 10/1991 | Cornils et al. | |
| 5,203,905 A | 4/1993 | Kuster et al. | |
| 5,285,660 A | 2/1994 | Petitcollin et al. | |
| 5,328,496 A | 7/1994 | Lesage et al. | |
| 5,376,158 A | 12/1994 | Shetterly et al. | |
| 5,421,940 A | 6/1995 | Cornils et al. | |
| 5,492,951 A | 2/1996 | Beyrle et al. | |
| 5,660,609 A | 8/1997 | Muller et al. | |
| 5,669,952 A * | 9/1997 | Claassen | C03B 23/0252 65/106 |
| 5,693,112 A | 12/1997 | Lesage et al. | |
| 5,713,976 A | 2/1998 | Kuster et al. | |
| 5,769,919 A * | 6/1998 | Claassen | C03B 23/0252 65/287 |
| 5,833,729 A | 11/1998 | Meunier et al. | |
| 5,938,810 A * | 8/1999 | De Vries, Jr. | C03B 23/0352 65/103 |
| 6,076,373 A | 6/2000 | Grodziski | |
| 6,138,477 A | 10/2000 | Morin | |
| 6,309,755 B1 | 10/2001 | Matsco et al. | |
| 6,318,125 B1 | 11/2001 | Diederen et al. | |
| 6,365,284 B1 | 4/2002 | Liposcak et al. | |
| 6,432,545 B1 | 8/2002 | Schicht et al. | |
| 6,572,990 B1 | 6/2003 | Oyama et al. | |
| 6,668,589 B1 | 12/2003 | Mizusugi et al. | |
| 6,749,926 B1 | 6/2004 | Yoshizawa | |
| 7,231,787 B2 | 6/2007 | Neuman et al. | |
| 7,302,813 B2 | 12/2007 | Balduin et al. | |
| 7,648,768 B2 | 1/2010 | Thiel et al. | |
| 7,655,313 B2 | 2/2010 | Blacker et al. | |
| 8,146,387 B2 | 4/2012 | Ollfisch et al. | |
| 8,327,667 B2 | 12/2012 | Balduin et al. | |
| 8,746,011 B2 | 6/2014 | Balduin et al. | |
| 9,650,291 B2 | 5/2017 | Manz et al. | |
| 2002/0117250 A1 | 8/2002 | Veerasamy | |
| 2002/0189295 A1 | 12/2002 | Bennett et al. | |
| 2002/0192473 A1 | 12/2002 | Gentilhomme et al. | |
| 2003/0182969 A1 | 10/2003 | Dunifon | |
| 2004/0107729 A1 | 6/2004 | Fukami et al. | |
| 2004/0129028 A1 | 7/2004 | Balduin et al. | |
| 2004/0219368 A1 | 11/2004 | Coster et al. | |
| 2005/0002081 A1 | 1/2005 | Beteille et al. | |
| 2005/0123772 A1 | 6/2005 | Coustet et al. | |
| 2005/0142332 A1 | 6/2005 | Sauer | |
| 2006/0182980 A1 | 8/2006 | Barton et al. | |
| 2007/0157671 A1 | 1/2007 | Tesconi et al. | |
| 2007/0026238 A1 | 2/2007 | Chiappetta et al. | |
| 2007/0039354 A1 | 2/2007 | Ollfisch et al. | |
| 2008/0070045 A1 | 3/2008 | Barton et al. | |
| 2008/0117371 A1 | 5/2008 | Shin et al. | |
| 2008/0134721 A1 | 6/2008 | Maeda | |
| 2008/0134722 A1 * | 6/2008 | Balduin | C03B 23/03 65/106 |
| 2008/0190143 A1 | 8/2008 | Balduin et al. | |
| 2009/0000334 A1 | 1/2009 | Boisselle et al. | |
| 2009/0047509 A1 | 2/2009 | Gagliardi et al. | |
| 2009/0117371 A1 | 5/2009 | Glaeser et al. | |
| 2009/0186213 A1 | 7/2009 | Ihlo et al. | |
| 2009/0277440 A1 | 11/2009 | Angel et al. | |
| 2009/0320824 A1 | 12/2009 | Henn et al. | |
| 2010/0236290 A1 | 9/2010 | Fukami et al. | |
| 2010/0257900 A1 | 10/2010 | Yajima et al. | |
| 2010/0314900 A1 | 12/2010 | Labrot et al. | |
| 2011/0027554 A1 | 2/2011 | Gouardes et al. | |
| 2011/0146172 A1 | 6/2011 | Mauvernay et al. | |
| 2012/0045652 A1 | 2/2012 | Zahn et al. | |
| 2012/0055197 A1 | 3/2012 | Balduin et al. | |
| 2012/0070624 A1 | 3/2012 | Payen et al. | |
| 2013/0042650 A1 | 2/2013 | Thellier et al. | |
| 2013/0129945 A1 | 5/2013 | Durandeau et al. | |
| 2013/0307286 A1 | 11/2013 | Balduin et al. | |
| 2013/0313852 A1 | 11/2013 | Balduin et al. | |
| 2013/0323415 A1 | 12/2013 | Brackley et al. | |
| 2013/0340479 A1 | 12/2013 | Balduin et al. | |
| 2014/0010976 A1 | 1/2014 | Gerardin et al. | |
| 2014/0011000 A1 | 1/2014 | Dunkmann et al. | |
| 2014/0093702 A1 | 4/2014 | Kitajima | |
| 2014/0230493 A1 | 8/2014 | Balduin et al. | |
| 2015/0104618 A1 | 4/2015 | Hayashi et al. | |
| 2015/0146286 A1 | 5/2015 | Hagen et al. | |
| 2016/0002100 A1 | 1/2016 | Melcher et al. | |
| 2016/0340479 A1 | 11/2016 | Crossley | |
| 2017/0210663 A1 | 7/2017 | Balduin et al. | |
| 2017/0217820 A1 | 8/2017 | Balduin et al. | |
| 2018/0170790 A1 | 6/2018 | Le et al. | |
| 2018/0186676 A1 | 7/2018 | Schall et al. | |
| 2018/0194664 A1 | 7/2018 | Balduin et al. | |

FOREIGN PATENT DOCUMENTS

| | | |
|---|---|---|
| CN | 1518524 A | 8/2004 |
| CN | 1531510 A | 9/2004 |
| CN | 2641043 Y | 9/2004 |
| CN | 1651345 A | 8/2005 |
| CN | 1764607 A | 4/2006 |
| CN | 101875536 A | 11/2010 |
| CN | 101888927 A | 11/2010 |
| DE | 3615225 A1 | 11/1987 |
| DE | 3930414 A1 | 3/1991 |
| DE | 4232554 C1 | 1/1994 |
| DE | 4337559 C1 | 3/1995 |
| DE | 4334213 A1 | 4/1995 |
| DE | 19604397 C1 | 7/1997 |
| DE | 69219496 T2 | 12/1997 |
| DE | 69423700 T2 | 10/2000 |
| DE | 10105200 A1 | 8/2002 |
| DE | 10314266 B3 | 6/2004 |
| DE | 102005001513 B3 | 6/2006 |
| DE | 102007059323 A1 | 6/2009 |
| EA | 027316 B1 | 7/2017 |
| EP | 0262046 A2 | 3/1988 |
| EP | 0434656 A2 | 6/1991 |
| EP | 0515847 A2 | 12/1992 |
| EP | 0531152 A2 | 3/1993 |
| EP | 0536607 A2 | 4/1993 |
| EP | 0576179 A1 | 12/1993 |
| EP | 0613865 A1 | 9/1994 |
| EP | 0677491 A2 | 10/1995 |
| EP | 0706978 A2 | 4/1996 |
| EP | 1047644 B1 | 1/2003 |
| EP | 1281613 A2 | 2/2003 |
| EP | 1358131 A2 | 11/2003 |
| EP | 1371616 A1 | 12/2003 |
| EP | 0877006 B1 | 1/2006 |
| EP | 1611064 B1 | 4/2008 |
| EP | 1218307 B1 | 7/2008 |
| EP | 1917222 B1 | 3/2009 |

(56) References Cited

FOREIGN PATENT DOCUMENTS

| | | | |
|---|---|---|---|
| EP | 2141135 | A1 | 1/2010 |
| EP | 2233444 | A1 | 9/2010 |
| EP | 2247549 | A2 | 11/2010 |
| EP | 1836136 | B1 | 5/2011 |
| EP | 2463247 | A1 | 6/2012 |
| EP | 2463248 | A1 | 6/2012 |
| EP | 2639032 | A1 | 9/2013 |
| EP | 2639032 | B1 | 9/2014 |
| FR | 2097019 | A1 | 3/1972 |
| GB | 813069 | A | 5/1959 |
| JP | S46021038 | B1 | 6/1971 |
| JP | S49110710 | A | 10/1974 |
| JP | S5130085 | B1 | 8/1976 |
| JP | S5243855 | B1 | 2/1977 |
| JP | S63027443 | U | 2/1988 |
| JP | S63156027 | A | 6/1988 |
| JP | H03504003 | A | 9/1991 |
| JP | H05147959 | A | 6/1993 |
| JP | H05195201 | A | 8/1993 |
| JP | H0647032 | A | 2/1994 |
| JP | H06256030 | A | 9/1994 |
| JP | H08183626 | A | 7/1996 |
| JP | H09309734 | A | 12/1997 |
| JP | 2002527349 | A | 8/2002 |
| JP | 2006256902 | A | 9/2006 |
| JP | 2006521271 | A | 9/2006 |
| JP | 2006528932 | A | 12/2006 |
| JP | 2008526659 | A | 7/2008 |
| JP | 2010013345 | A | 1/2010 |
| JP | 2013529170 | A | 7/2013 |
| JP | 2014500222 | A | 1/2014 |
| JP | 2014504229 | A | 2/2014 |
| KR | 20040037078 | A | 5/2004 |
| KR | 20070088745 | A | 8/2007 |
| KR | 101343631 | B1 | 12/2013 |
| KR | 20140019312 | A | 2/2014 |
| RU | 2009107 | C1 | 3/1994 |
| RU | 2036861 | C1 | 6/1995 |
| RU | 2098362 | C1 | 12/1997 |
| RU | 2444478 | C1 | 3/2012 |
| RU | 2550611 | C1 | 5/2015 |
| WO | 00/29347 | A1 | 5/2000 |
| WO | 02/064519 | A1 | 8/2002 |
| WO | 03/024649 | A1 | 3/2003 |
| WO | 2004/087590 | A2 | 10/2004 |
| WO | 2006/043026 | A1 | 4/2006 |
| WO | 2006/072721 | A1 | 7/2006 |
| WO | 2007/042688 | A1 | 4/2007 |
| WO | 2009/112759 | A2 | 9/2009 |
| WO | 2010/074548 | A1 | 7/2010 |
| WO | 2010/136702 | A1 | 12/2010 |
| WO | 2011/088330 | A2 | 7/2011 |
| WO | 2011/105991 | A1 | 9/2011 |
| WO | 2012/022876 | A2 | 2/2012 |
| WO | 2012/080071 | A1 | 6/2012 |
| WO | 2012/080072 | A1 | 6/2012 |
| WO | 2012/118612 | A1 | 9/2012 |
| WO | 2012/131243 | A1 | 10/2012 |
| WO | 2012/176813 | A1 | 12/2012 |
| WO | 2013/131667 | A1 | 9/2013 |
| WO | 2013/146264 | A1 | 10/2013 |
| WO | 2014/166793 | A1 | 10/2014 |
| WO | 2016/066309 | A1 | 5/2016 |
| WO | 2016/066310 | A1 | 5/2016 |
| WO | 2017/029252 | A1 | 2/2017 |
| WO | 2017/042037 | A1 | 3/2017 |
| WO | 2017/089070 | A1 | 6/2017 |
| WO | 2017/129307 | A1 | 8/2017 |

OTHER PUBLICATIONS

International Preliminary Report on Patentability for International Application No. PCT/EP2016/080918 filed Dec. 14, 2016 on behalf of Saint-Gobain Glass France, dated Feb. 13, 2017. 6 pages (English Translation + German Original).

International Search Report for International Application No. PCT/EP2015/070430 filed on Sep. 8, 2015 in the name of Saint-Gobain Glass France, dated Nov. 24, 2015. 8 pages. (English translation + German original).

International Search Report for International Application No. PCT/EP2015/070432 filed on Sep. 8, 2015 on behalf of Saint-Gobain Glass France, dated Dec. 7, 2015. 7 pages. (English translation + German original).

International Search Report for International Application No. PCT/EP2016/069317 filed on Aug. 15, 2016 on behalf of Saint-Gobain Glass France, dated Oct. 19, 2016. 5 Pages. (German Original + English Translation).

International Search Report for International Application No. PCT/EP2016/076072 filed on Oct. 28, 2016 on behalf of Saint-Gobain Glass France, dated Jan. 13, 2017. 5 pages. (German + English Translation).

International Search Report for International Application No. PCT/EP2016/080918 filed on Dec. 14, 2016 in the name of Saint-Gobain Glass France, dated Feb. 13, 2017. 7 pages. (German Original + English translation).

Non-Final Office Action for U.S. Appl. No. 15/328,471, filed Jan. 23, 2017, on behalf of Saint-Gobain Glass France, dated Dec. 11, 2018. 14 pages.

Non-Final Office Action for U.S. Appl. No. 15/328,475, filed Jan. 23, 2017 on behalf of Saint-Gobain Glass France, dated Mar. 18, 2019. 16 pages.

Restriction Requirement for U.S. Appl. No. 15/328,471, filed Jan. 23, 2017, on behalf of Saint-Gobain Glass France, dated Aug. 30, 2018. 7 pgs.

International Preliminary Report on Patentability for International Application No. PCT/EP2015/070432 filed on Sep. 8, 2015 in the name of Saint-Gobain Glass France, dated May 2, 2017. 8 pages.

International Preliminary Report on Patentability for International Application No. PCT/EP2016/069317 filed Aug. 15, 2016 on behalf of Saint-Gobain Glass France, dated Feb. 20, 2018. 5 pages.

International Preliminary Report on Patentability for International Application No. PCT/EP2016/076072 filed Oct. 28, 2016 on behalf of Saint-Gobain Glass France, dated Jan. 13, 2017. 7 pages. (German Original + English Translation).

International Preliminary Report on Patentability for International Application No. PCT/EP2015/070430 filed Sep. 8, 2015 on behalf of Saint-Gobain Glass France, dated May 2, 2017. 7 pages.

Written Opinion for International Application No. PCT/EP2015/070430 filed Sep. 8, 2015 on behalf of Saint-Gobain Glass France, dated Nov. 24, 2015. 12 pages. (English Translation + German Original).

Written Opinion for International Application No. PCT/EP2015/070432 filed Sep. 8, 2015 on behalf of Saint-Gobain Glass France, dated Dec. 7, 2015. 14 pages. (English Translation + German Original).

Written Opinion for International Application No. PCT/EP2016/076072 filed Oct. 28, 2016 on behalf of Saint-Gobain Glass France, dated Jan. 13, 2017. 5 pages. (German + English Translation).

Written Opinion for International Application No. PCT/EP2016/080918 filed Dec. 14, 2016 on behalf of Saint-Gobain Glass France, dated Feb. 13, 2017. 9 pages. (English Translation + German Original).

Written Opinion for International Application No. PCT/EP2016/069317 filed on Aug. 15, 2016 on behalf of Saint-Gobain Glass France, dated Oct. 19, 2016. 9 pages. (German Original + English Translation).

Non-Final Office Action for U.S. Appl. No. 15/741,264, filed Dec. 31, 2017 on behalf of Saint Gobain Glass France dated Jan. 2, 2020 12 pages.

Final Office Action for U.S. Appl. No. 15/328,471, filed Jan. 23, 2017 on behalf of Saint Gobain Glass France dated May 15, 2019 9 pages.

Final Office Action for U.S. Appl. No. 15/328,475, filed Jan. 23, 2017 on behalf of Saint Gobain Glass France dated Aug. 27, 2019 17 pages.

(56) References Cited

OTHER PUBLICATIONS

Indian First Examination Report for IN Application No. 201837004251 filed on Feb. 5, 2018 on behalf of Saint Gobain Glass France dated Jun. 28, 2019 5 pages.
Restriction Requirement for U.S. Appl. No. 15/741,256, filed Dec. 30, 2017 on behalf of Saint-Gobain Glass France dated Sep. 17, 2019 8 pages.
Restriction Requirement for U.S. Appl. No. 15/741,264, filed Dec. 31, 2017 on behalf of Saint-Gobain Glass France dated Sep. 17, 2019 7 pages.
Russian Office Action for RU Application No. 2018115725/03 filed on Dec. 14, 2016 on behalf of Saint Gobain Glass France dated Apr. 24, 2019 5 pages (English Translation Only).
International Search Report for PCT/EP2016/070140 filed Aug. 26, 2016 on behalf of Saint-Gobain Glass France, dated Oct. 19, 2016. 9 pages. (German Original + English translation).
Written Opinion for PCT/EP2016/070140 filed Aug. 26, 2016 on behalf of Saint-Gobain Glass France, dated Oct. 19, 2016. 9 pages, (German Original + English translation).

\* cited by examiner

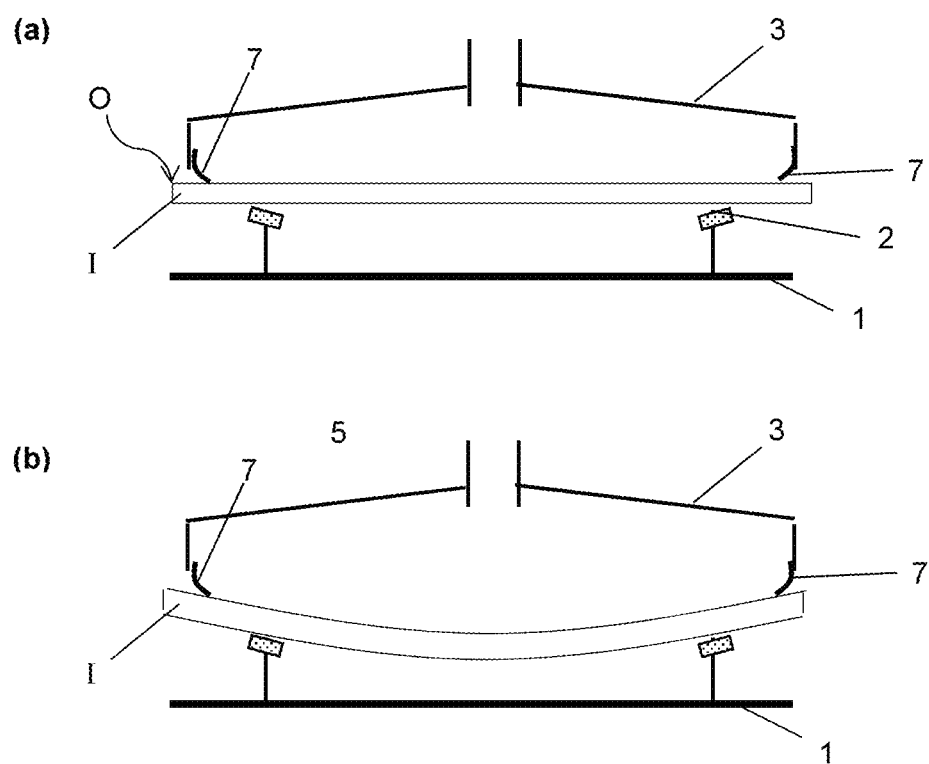
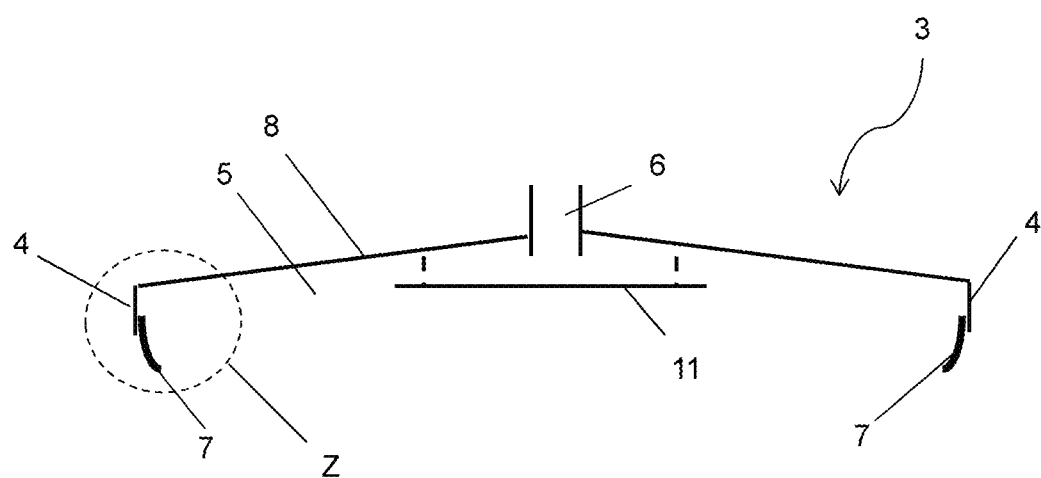
Fig. 1
Fig. 2

OVERPRESSURE-ASSISTED GRAVITY BENDING METHOD AND DEVICE SUITABLE THEREFOR

CROSS-REFERENCE TO RELATED APPLICATIONS

The present application is the U.S. National Stage of International Patent Application No. PCT/EP2016/070140 filed on Aug. 26, 2016 which, in turn, claims priority to European Patent Application No. 15184166.5 filed on Sep. 8, 2015.

The invention relates to an overpressure-assisted gravity bending method for glass panes, a device suitable therefor, as well as the use of an upper shaping tool for producing an overpressure in a gravity bending method.

Glazings for motor vehicles typically have a bend. A common method for bending glass panes is the so-called gravity bending method (also known as sag bending). Therein, the glass pane, flat in the initial state, is arranged on the supporting surface of a bending mould. The pane is then heated to at least its softening temperature such that it rests, under the influence of gravity, on the supporting surface. By means of the design of the supporting surface, the shape of the glass pane can thus be influenced. The final bend can be achieved by gravity bending. Such a method is known, for example, from GB 813069 A. However, in the case of more complex pane shapes, multistage bending methods are frequently used. Typically, a preliminary bend is produced in a first bending step by means of gravity bending, whereas the final shape is produced in a second bending step—frequently using press bending between two complementary bending moulds. Such multistage bending methods are known, for example, from EP 1 836 136 B1, US 2004107729 A1, EP 0531152 A2, and EP 1371616 A1.

The disadvantages of conventional gravity bending methods include high bending temperatures to effectively soften the glass panes and long bending times until the panes have taken their desired shape. Both result in increased production costs.

EP 0 706 978 A2 discloses a gravity bending method that is assisted by overpressure. The pane to be bent is arranged between the lower gravity bending mould and an upper shaping tool. An overpressure on the upper glass surface is produced by the upper shaping tool, by means of which the shaping of the pane in the gravity bending mould is accelerated. The upper shaping tool can have a full-surface or a frame-like peripheral contact surface. The shaping tool can be brought directly into contact with the glass pane ("hard seal") or positioned slightly above the glass pane ("soft seal").

WO 2014/166793 A1 discloses the use of metal fabrics and metal felts in glass bending. The bending tools are covered with the fabric or felt as a heat-resistant separation material.

U.S. Pat. No. 5,328,496 A also discloses a metal-containing, in particular stainless-steel-containing fabric as a covering for a tool in a bending and tempering process for glass panes.

US 2016/0340479 A1 discloses a tool for raising and bending glass panes, whose frame-like contact surface is lined with fire-resistant fibres of glass, metal, or ceramic.

The object of the present invention is to provide a further improved gravity bending method and a device suitable therefor. In particular, an overpressure for assisting the gravity bending should be produced with greater efficiency.

The object of the invention is accomplished according to the invention by a device for bending at least one glass pane, at least comprising a gravity bending mould with a supporting surface that is suitable for arranging at least one glass pane thereon, an upper shaping tool arranged opposite the supporting surface, which upper shaping tool is suitable for producing an overpressure on the surface of the at least one glass pane arranged on the supporting surface facing away from the supporting surface, wherein the shaping tool has a cover that forms a hollow space open in the direction of the gravity bending mould and is equipped with a sealing lip arranged on an edge section of the cover for making contact with the surface of the at least one glass pane facing away from the supporting surface, and wherein the shaping tool is equipped with means for introducing a gas into the hollow space to produce the overpressure.

The object of the invention is, moreover, accomplished by a method for bending at least one glass pane, at least comprising the following process steps:

(a) Arranging at least one glass pane on a supporting surface of a gravity bending mould, (b) Heating the glass pane to at least its softening temperature, (c) Producing an overpressure on the surface of the at least one glass pane facing away from the supporting surface using an upper shaping tool that has a cover that forms a hollow space open in the direction of the gravity bending mould and is equipped with a sealing lip arranged on an edge section of the cover, which contacts the surface of the at least one glass pane facing away from the supporting surface, wherein the overpressure is produced by introducing a gas into the hollow space, (c) Cooling the glass pane.

The device and the method are presented together in the following, with explanations and preferred embodiments referring equally to the device and the method.

The bending method to be performed with the device according to the invention can be referred to as overpressure-assisted gravity bending. As in the case of a prior art gravity bending method, gravity acts on the softened glass pane, which rests as a result on the bending mould. This procedure is, however, assisted in that the glass pane is subjected to an overpressure. Thus, for one thing, the deformation is accelerated such that the desired shape of the glass pane is achieved more rapidly. For another, adequate deformation can be achieved, even at lower temperatures. Thus, production costs can be reduced and cycle times shortened.

The device according to the invention for bending at least one glass pane comprises at least a lower gravity bending mould and an upper shaping tool. The glass pane to be bent is placed on the gravity bending mould and arranged between the gravity bending mould and the upper shaping tool.

According to the invention, the shaping tool is brought into contact with the glass pane by means of a sealing lip. By means of the sealing lip according to the invention, a positive connection between the shaping tool and the glass pane can be made, by means of which a higher overpressure can be produced. Thus, greater efficiency of the glass bending process is achieved. By means of the sealing lip, the risk of damage to the glass is also reduced compared to shaping tools that make contact with the glass via their metal contact surfaces. These are major advantages of the present invention.

The invention also includes an arrangement for bending at least one glass pane, comprising the device according to the invention and a glass pane arranged on the supporting surface of the gravity bending mould.

The gravity bending mould has a supporting surface that is suitable for arranging at least one glass pane thereon. The supporting surface defines the shape of the bent glass pane. If the glass pane is heated to at least its softening temperature, it rests under the influence of gravity on the supporting surface, by which means the desired shape is achieved. A gravity bending mould is a so-called "lower mould" on which the pane can be placed such that the supporting surface makes contact with the lower surface of the glass pane facing the ground. Customarily, the edge region of the glass pane protrudes circumferentially beyond the supporting surface.

The present invention is not restricted to a specific type of gravity bending mould. The supporting surface is preferably implemented concave. The term "a concave mould" is understood to mean a mould in which the corners and edges of the glass pane in the intended contact with the supporting surface are bent in the direction away from the bending mould.

The supporting surface can, for example, be implemented full surface and be brought full surface into contact with the glass pane. However, in a preferred embodiment, the gravity bending mould has a frame-like supporting surface. Only the frame-like supporting surface is in direct contact with the glass pane, whereas most of the pane has no direct contact with the tool. Thus, panes with particularly high optical quality can be produced. Such a tool can also be referred to as a ring (bending ring) or frame (frame mould). In the context of the invention, the term "frame-like supporting surface" serves only to distinguish the tool according to the invention from a full-surface mould. The supporting surface need not form a complete frame, but can also be discontinuous. The supporting surface is implemented in the form of a complete or discontinuous frame.

The width of the frame-like supporting surface is preferably from 0.1 cm to 20 cm, particularly preferably from 0.1 cm to 5 cm, for example, 0.3 cm.

The surface of the glass pane facing away from the gravity bending mould is subjected, according to the invention, to overpressure. The surface of the glass pane facing away from the gravity bending mould can also be referred to as the "upper surface"; and the surface facing the gravity bending mould, as the "lower surface". In the context of the invention, the term "overpressure" means a pressure that is greater than the ambient pressure. By means of the overpressure, the softened glass pane is, so to speak, pressed into the bending mould, by which means the gravitational effect is assisted.

During the bending procedure, the upper shaping tool is arranged opposite the supporting surface of the gravity bending mould such that a glass pane can be arranged between the gravity bending mould and the shaping tool. It is suitable for producing an overpressure on the surface of the glass pane arranged on the supporting surface facing away from the supporting surface. The shaping tool is not implemented as a mould with a full-surface contact surface, but rather as a hollow mould. The shaping tool has a cover, made, for example, from a metal sheet. The cover is shaped such that it forms a hollow space. The hollow space is not a closed hollow space, but rather has a large-area opening that faces the gravity bending mould. The tool can also be referred to as bell-like or hood-like.

The shaping tool is equipped with at least one sealing lip. The sealing lip serves for contacting with the upper surface of the glass pane to be bent. The sealing lip is arranged on a circumferential edge section of the cover, in particular on the surface of the edge section facing the hollow space. The hollow space of the shaping tool, which is, according to the invention, open toward the gravity bending tool and toward the glass pane, is, so to speak, sealed by the glass pane via the sealing lip such that an overpressure can be effectively produced in the hollow space and on the upper surface of the glass pane. The term "edge section" refers to a region of the cover associated with the edge, with the sealing lip typically being at a distance from the side edge of the cover.

The sealing lip makes contact with the glass pane circumferentially in its edge region such that the overpressure according to the invention can be produced on most of the upper surface. The contact region between the sealing lip and the surface of the glass pane is preferably at a distance of at most 20 cm from the side edge of the glass pane, particularly preferably at most 10 cm. The overpressure is preferably produced on at least 80% of the surface, with the regions of the surface not subjected to overpressure arranged in its edge region, outside the region surrounded by the sealing lip. The pressure produced by the upper shaping tool is homogeneously distributed on the surface.

The overpressure should be produced on as large a share of the surface of the glass pane as possible. The overpressure should at least be produced on the regions of the glass pane that are resting on the supporting surface of the gravity bending mould, as well as, in the case of a frame-like supporting surface, the regions surrounded thereby.

The sealing lip is preferably implemented circumferentially without interruption. However, the sealing lip can, in principle, also have interruptions. The interruptions should be dimensioned such that the overpressure in the hollow space is not dissipated too rapidly. There can be a single sealing lip that is correspondingly curved along the circumferential edge sections. However, a plurality of sealing lips can also be combined.

The device according to the invention also includes means for moving the gravity bending mould and the shaping tool relative to one another. By this means, the gravity bending mould and the shaping tool are brought closer together after the glass pane has been placed on the gravity bending mould such that the shaping tool is brought into contact with the glass pane. They can be brought together by moving the gravity bending mould, the shaping tool, or both. In a preferred embodiment, the shaping tool is moved and lowered onto the glass pane, whereas the gravity bending mould executes no vertical movement.

The device according to the invention also includes means for heating the glass pane to softening temperature. Typically, the gravity bending mould and the upper shaping tool are arranged within a heatable bending furnace or a heatable bending chamber. For heating, the glass pane can pass through a separate chamber, for example, a tunnel furnace.

The overpressure is produced by introducing a gas into the hollow space of the shaping tool. For this, the shaping tool is equipped with means for introducing a gas into the hollow space to produce the overpressure. For this, a pipe (inflow pipe) that leads from the outside environment into the hollow space is preferably set in the cover. The gas is introduced into the hollow space via the pipe. In a preferred embodiment, the gas is, in particular, compressed air, since this can be produced economically. However, in principle, other gases can also be used, for example, carbon dioxide or nitrogen. The air can be conveyed through the pipe into the hollow space in any manner, for example, by Venturi nozzles or a blower.

The inflowing gas is preferably heated so as to not cool the glass pane during the bending process, which typically takes place at elevated temperatures. The temperature of the gas preferably corresponds approx. to the temperature of the glass pane.

A deflector plate is preferably arranged opposite the pipe outlet in the hollow space such that inflowing gas strikes the deflector plate. This prevents inflowing gas from directly striking the glass pane, and homogeneous overpressure can be produced in the entire hollow space, or, more specifically, on the entire surface region delimited by the sealing lip.

The sealing lip according to the invention is preferably made of felt or fleece. Particularly preferably, a belt is arranged in the felt or fleece to weight the sealing lip. Thus, the sealing lip can be reliably held in contact with the glass surface. A felt or fleece strip can, for example, be wrapped around the belt. The felt or the fleece is preferably metal-containing, particularly preferably stainless-steel-containing. The felt or the fleece is preferably a metal-containing felt or metal fleece, particularly preferably a stainless-steel-containing felt or stainless steel fleece. These materials have, on the one hand, adequate stability for industrial mass production and are, on the other hand, adequately soft to not damage the glass surface. The material thickness of the felt or fleece is preferably from 0.1 mm to 10 mm, particularly preferably from 1 mm to 5 mm.

The belt (weighted belt) preferably contains glass fibres and/or metal fibres, particularly preferably a glass fibre—metal fibre mixture. The thickness of the belt is preferably from 1 mm to 100 mm, particularly preferably from 5 mm to 30 mm.

The cover preferably has a material thickness of at most 5 mm, particularly preferably from 2 m to 4 mm. By means of these low material thicknesses, the weight of the shaping tool can be kept low. The cover is preferably made of steel or stainless steel.

In an advantageous embodiment, the edge section of the cover, on which the sealing lip is arranged, is, in a purposeful arrangement of the shaping tool, directed downward. The edge section is preferably arranged substantially vertically. Thus, the shaping tool can advantageously be brought into contact with the glass pane. The downward directed edge section is frequently also referred to as an "apron". The side edge of the cover can be arranged on the end of the downward directed edge section and point downward. However, it does not negatively affect the function if, for example, the end of the edge section where the sealing lip is not arranged is bent such that the side edge does not point downward.

In an advantageous embodiment of the invention, the device is dimensioned and configured such that, during bending, the sealing lip is arranged completely above the surface of the glass pane to be bent. In the context of the invention, here, "above" means that the projection of the sealing lip to the plane of the glass pane is arranged within the area of the glass pane. The sealing lip does not protrude beyond the side edges of the glass pane to be bent. The edge section of the cover, or, more specifically, the contact region between the cover and the sealing lip is arranged above the glass pane. Since the force that is created by the lowering of the shaping tool and seals the hollow space thus acts directly on the upper surface, better sealing and, hence, a higher overpressure can be produced, by means of which the efficiency of the bending process increases. In this embodiment, the sealing lip must extend beyond the edge section of the cover and protrude out of the hollow space.

In another advantageous embodiment of the invention, the device is dimensioned and configured such that, during bending, the edge section surrounds the glass pane to be bent. The edge section (the "apron") thus overlaps, so to speak, the glass pane such that the glass pane—at least in its flat initial state—is arranged completely inside the hollow space of the shaping tool. The sealing lip extends beyond the side edge of the glass pane to be bent. The sealing lip runs from the edge section of the cover surrounding the glass pane to the upper surface of the glass pane. In this embodiment, the sealing lip is arranged completely inside the hollow space of the shaping tool and does not protrude beyond the edge section. The advantage resides in the fact that the shaping tool need not be adapted to the size of the glass pane to be bent, but, rather, that various glass panes of different sizes can be processed with the same tool, so long as the glass pane fits into the hollow space and the sealing lip is adequately long. The different sizes of the glass panes are, so to speak, compensated by the sealing lip.

It is, of course, also possible, in the shaping tool of the latest mentioned advantageous embodiment, to lengthen the sealing lip such that it extends out of the hollow space and thus to bring the shaping tool into contact with the glass pane without the glass pane being arranged inside the hollow space. In both variants, the projection of the contact region between the sealing lip and the cover surrounds the glass pane at the level of the glass pane.

The overpressure on the upper surface of the glass pane is preferably from 5 mbar to 50 mbar, particularly preferably from 10 mbar to 30 mbar. Thus, particularly good results are achieved in terms of the bending. The pressure required also depends on the bending temperature—the higher the bending temperature, the softer the glass pane and the lower the necessary overpressure. The term "overpressure" refers to the positive pressure difference relative to the ambient pressure.

An advantage of the invention is that by means of the overpressure assistance, the desired pane shape can be achieved faster than with prior art gravity bending. Thus, shorter cycle times can be realised in industrial mass production. In an advantageous embodiment, the overpressure is produced over a period of at most 100 second on the upper surface of the glass pane, preferably at most 60 seconds, particularly preferably at most 30 seconds. The period over which the overpressure is produced on the surface can, for example, be from 5 seconds to 30 seconds.

Another advantage of the invention is that the bending can be achieved by overpressure assistance at lower temperatures than with prior art gravity bending. Thus, energy can be saved because the bending chamber need not be heated so much. Soda lime glass, the typical glass for window panes, is usually bent at approx. 630° C. By means of the overpressure assistance according to the invention, bending can be done already at lower temperatures, for example, 610° C. with adequate speed. Consequently, the maximum temperature to which the glass pane is heated is, in an advantageous embodiment, less than 630° C., preferably less than 620° C., when the glass pane contains or is made of soda lime glass.

The glass pane to be bent can, however, also contain other types of glass such as borosilicate glass or quartz glass. The thickness of the glass pane is typically from 0.2 mm to 10 mm, preferably 0.5 mm to 5 mm.

Another advantage of the invention consists in that, by means of the overpressure assistance, more complex pane shapes can be produced than with pure gravity bending. With prior art multistage bending processes, it is common to use a plurality of lower bending moulds until the final shape of the glass pane is achieved, for example, a first lower mould for pre-bending using gravity and a second lower mould for press bending. For this, the pane can be lifted from the first mould and placed on the second mould. Also known, alternatively, are lower bending moulds that have two different support surfaces that can be moved relative to one another such that it is possible to specify which of the support surfaces the glass pane rests on. Since, with the method according to the invention, more complex pre-bending can be produced, it is frequently unnecessary to change the lower bending mould before a final bending step. Consequently, in a preferred embodiment, during the entire bending process all the way to achieving the desired final bending, no lower mould other than the gravity bending mould according to the invention is used. Further bending steps can follow the overpressure-assisted gravity bending according to the invention, such as a press bending step. However, at the time of these additional steps, the glass pane remains arranged on the gravity bending mould. This has the advantage that fewer or less complex bending moulds are used in the bending furnace, i.e., overall, less material is introduced from the outside into the bending furnace. Thus, the bending furnace is cooled less, which results in an energy savings in terms of heating performance. Additionally, less complex moulds are also less prone to error.

The sequence of the process steps must not be interpreted to mean that measures for producing the overpressure are taken only after the softening temperature has been exceeded. Instead, the glass pane can already be subjected to the overpressure during heating. The overpressure can, of course, only develop its effect after the softening temperature is reached; however, for process technology reasons, it may be simpler to produce the overpressure continuously.

The overpressure-assisted gravity bending according to the invention can be the only bending step or also part of a multistage bending process in which other bending steps precede or follow. For example, other bending steps can occur between the overpressure-assisted gravity bending and the cooling of the glass pane, for example, using gravity bending, press bending, or suction bending. For this, the glass pane can be transferred from the gravity bending mould according to the invention to other bending moulds.

The cooling of the glass pane can be done on the gravity bending mould according to the invention or even on another mould onto which the pane is transferred. Cooling can be done at ambient temperature or by active cooling.

The gravity bending mould according to the invention can be implemented movable, for example, mounted on a cart. Thus, the glass pane to be bent can be transported on the gravity bending mould under the upper shaping tool. The gravity bending mould can pass through a furnace for heating, with the glass pane being heated to bending temperature or at least preheated. By means of physical separation of the heating and the overpressure-assisted bending into different chambers of a bending furnace, higher cycle rates can be obtained than when the pane is not heated until reaching the bending chamber. Typical bending temperatures are from 500° C. to 700° C., preferably from 550° C. to 650° C.

Even multiple, for example, two glass panes lying one atop the other can be bent simultaneously by the device according to the invention and the method according to the invention. This can, in particular, be desirable when two individual panes are to be laminated later to form a composite glazing so their shape is optimally matched to one another. For this, the glass panes are arranged flat one atop the other and simultaneously bent congruently together. A separation means is arranged between the glass panes, for example, a separating powder or a fabric such that the glass panes can again be detached from one another after bending. In an advantageous embodiment, the method is applied to multiple, in particular, to two glass panes lying one atop the other.

The invention also includes the use of an upper shaping tool that has a cover that forms a hollow space open in the direction of the gravity bending mould and is equipped with a sealing lip arranged on an edge section of the cover for assisting a gravity bending process, wherein, with the shaping tool, an overpressure is produced on the surface of a glass pane to be bent facing away from the gravity bending mould, by introducing a gas into the hollow space. For this, the sealing lip (7) is brought into contact with the surface (O) of the glass pane (I).

In the following, the invention is explained in detail with reference to drawings and exemplary embodiments. The drawings are schematic representations and not to scale. The drawings in no way limit the invention.

Figure 4:
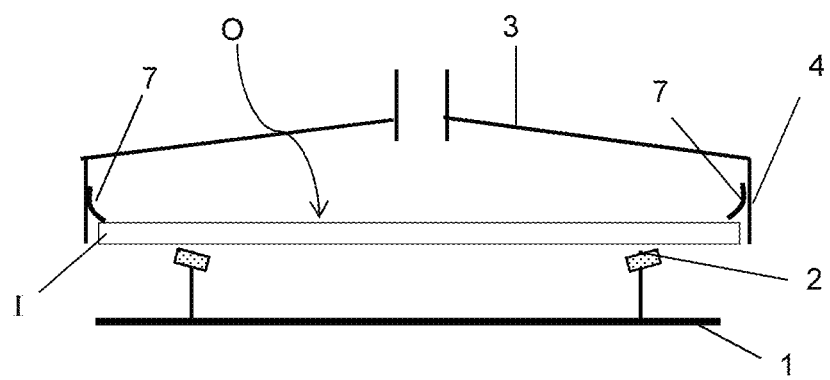
Figure 5:
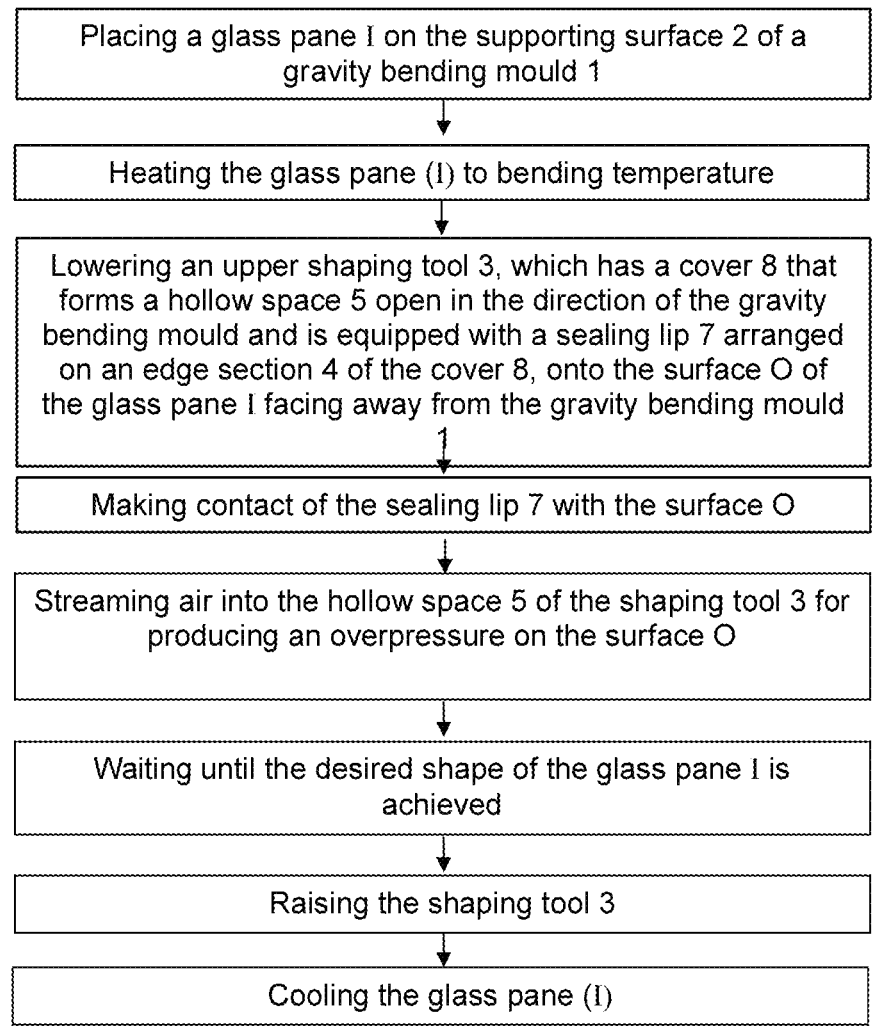

They depict:

FIG. 1 a cross-section through a device according to the invention during the method according to the invention, FIG. 2 a cross-section through an embodiment of the upper shaping tool according to the invention, FIG. 3 an enlarged representation of the detail Z of FIG. 2, FIG. 4 a cross-section through another embodiment of the upper shaping tool according to the invention during the method according to the invention, and FIG. 5 a flowchart of an embodiment of the method according to the invention.

FIG. 1 depicts a device according to the invention during the method according to the invention for bending a glass pane I. The glass pane I, flat in the initial state, is placed on the frame-like supporting surface 2 of a gravity bending mould 1 (FIG. 1*a*). As customary in gravity bending, the glass pane I is heated to a bending temperature that corresponds at least to the softening temperature. The softened glass pane I then clings to the supporting surface 2 under the effect of gravity (FIG. 1*b*).

According to the invention, the gravity bending is assisted by an upper shaping tool 3, which produces an overpressure on the upward facing surface O of the glass pane I facing away from the supporting surface 2. The upper shaping tool 3 is a bell-like or hood-like tool that has a hollow space 5 that faces the glass pane I. The upper shaping tool 3 makes contact with the upper surface O of the glass pane I via a circumferential sealing lip such that the glass pane I seals the hollow space 5. The overpressure on the surface O is produced by compressed air flowing into the hollow space 5.

By means of the overpressure, the deformation of the glass pane I is assisted under the influence of gravity. Thus, the desired shape can already be achieved at lower bending temperatures and in less time. Moreover, more complex pane shapes can be realised than with pure gravity bending. The contacting of the upper shaping tool with the sealing lip 7 results in effective sealing of the hollow space 5 such that an advantageously high overpressure can be produced. Due to the fact that the glass pane I makes contact with the flexible sealing lip 7 instead of the rigid metal cover of the shaping tool, damage or a reduction in the optical quality of the glass pane I can be avoided. These are major advantages of the present invention.

FIG. 2 and FIG. 3 depict a detailed representation of the upper shaping tool 3 of FIG. 1. The shaping tool 3 has a cover 8 that is formed from a steel plate only 3 mm thick.

Thus, the shaping tool 3 has only a low weight. The cover 8 forms a hollow space 5 that is open in the direction of the glass pane I. An edge section 4 of the cover 8 runs substantially vertically (a so-called "apron"). The sealing lip 7 is attached on this edge section, and, in fact, on the side facing the hollow space 5.

The vertical edge section 4 of the cover 8 and the sealing lip 7 are, as depicted in FIG. 1, arranged completely above the glass pane I. Hence, during bending, the edge section 4 is directed onto the surface O. Since the pressing force produced by the upper shaping tool 3 acts directly on the surface O, efficient sealing of the hollow space 5 is achieved and a high overpressure can be produced. The sealing lip 7 extends out of the hollow space 5.

The circumferential sealing lip 7 is made of a stainless steel fleece 9 with a material thickness of 3 mm. A strip of the stainless steel fleece 9 is placed around a belt 10, which is thus arranged inside the sealing lip and effects weighting of the sealing lip 7. The belt is made of a glass fibre—metal fibre mixture and has a roughly circular cross-section with a diameter of 20 mm. Such a sealing lip 7 ensures good sealing of the hollow space 5, is adequately flexible to avoid negative effects on the glass pane I, and adequately stable to be able to be used industrially.

The cover 8 is equipped centrally with an inflow pipe 6, via which compressed air can flow into the hollow space 5 to produce the overpressure. To avoid direct impact of the inflowing air on the surface O and to produce homogeneous overpressure on the surface O, a deflector plate 11, which the inflowing air strikes, is arranged in the hollow space 5 opposite the opening of the inflow pipe 6.

FIG. 4 depicts another embodiment of the upper shaping tool according to the invention 3 during the method according to the invention. Here again, the cover 8 has a vertically running edge section 4. The shaping tool 3 is, however, implemented larger such that the vertical edge section 4 surrounds the glass pane 1 and the glass pane I is thus arranged in the hollow space 5. The sealing lip 7 extends from the edge section onto the surface O of the glass pane I.

This embodiment has the advantage that the upper shaping tool 3 need not be produced specifically for a certain pane type. Instead, with suitable dimensioning of the sealing lip 7, even glass panes I of different sizes can be bent with the same shaping tool 3. The sealing action of the sealing lip 7 is, however, somewhat less than in the embodiment of FIG. 1.

FIG. 5 depicts an exemplary embodiment of the method according to the invention using a flowchart.

EXAMPLE

In a series of experiments, different bending processes were compared with one another:
1. Prior art gravity bending without applying overpressure
2. Gravity bending using an upper shaping tool without a sealing lip, which was held at a distance of 5 mm from the upper surface of the glass pane (cf. EP 0 706 978 A2, soft seal)
3. Gravity bending according to the invention using an upper shaping tool with a sealing lip In each case, the panes were heated to the temperature T. The time t that is necessary to achieve the specified final bending by the gravity bending mould was measured. In addition, the approximate bending speed v was determined.

The results are summarised in Table 1.

TABLE 1

| | Bending process | T | Over-pressure | t | v |
|---|---|---|---|---|---|
| 1 | Gravity bending | 630° C. | — | 120 sec | 0.2 mm/s |
| 2 | Gravity bending with upper shaping tool without sealing lip | 610° C. | 6 mbar | 50 s | 0.5 mm/s |
| 3 | According to the invention: Gravity bending with upper shaping tool with sealing lip | 610° C. | 20 mbar | 25 s | 1 mm/s |

As is indicated in the table, a significant time savings can be achieved at a lower bending temperature by the method according to the invention. Under the same conditions with regard to air inflow, a significantly higher pressure can be produced with the tool according to the invention than with the comparative tool without a sealing lip. This is a major advantage of the invention.

LIST OF REFERENCE CHARACTERS (1) gravity bending mould
(2) supporting surface of the gravity bending mould 1
(3) upper shaping tool
(4) edge section of the shaping tool 3
(5) hollow space of the shaping tool 3
(6) inflow pipe of the shaping tool 3
(7) sealing lip of the shaping tool 3
(8) cover of the shaping tool 3
(9) felt/fleece of the sealing lip 7
(10) belt of the sealing lip 7
(11) deflector plate of the shaping tool 3
(I) glass pane
(O) upper surface of the glass pane I, facing away from the supporting surface 2
(Z) enlarged section of the shaping tool 3

The invention claimed is:

1. A device for bending at least one glass pane, comprising: a gravity bending mould with a supporting surface, which is suitable for arranging at least one glass pane thereon; and an upper shaping tool arranged opposite the supporting surface, the upper shaping tool being suitable for producing an overpressure on a first surface of the at least one glass pane arranged on the supporting surface, the first surface facing away from the supporting surface, wherein the upper shaping tool has a cover that forms a hollow space open in a direction of the gravity bending mould and comprises a flexible sealing lip disposed between the cover and the first surface when contacting the first surface, the flexible sealing lip comprising a first portion contacting an edge section of the cover on a side of the edge section facing the hollow space and a second portion, integral with the first portion, distanced and extending apart from the edge section of the cover towards a region interior to the hollow space for making contact with the first surface, the second portion containing a weighting belt, and wherein the upper shaping tool is equipped with means for introducing a gas into the hollow space in order to produce the overpressure.

2. The device according to claim 1, wherein a contact region between the second portion of the sealing lip and the first surface has a distance of at most 20 cm from a side edge of the glass pane.

3. The device according to claim 1, wherein the sealing lip is made of a felt or fleece.

4. The device according to claim 3, wherein the felt or the fleece is metal-containing.

5. The device according to claim 3, wherein the felt or the fleece is stainless-steel containing.

6. The device according to claim 1, wherein the weighting belt contains glass fibres and/or metal fibres.

7. The device according to claim 1, wherein the edge section is directed downward.

8. The device according to claim 7, wherein the edge section is arranged substantially vertically.

9. The device according to claim 1, wherein the gravity bending mould has a frame-like, concave supporting surface.

10. The device according to claim 1, wherein the cover has a material thickness of at most 5 mm.

11. The device according to claim 1, wherein the weighting belt contains a glass fibre-metal fibre mixture.

12. A method for bending at least one glass pane, comprising:
arranging at least one glass pane on a supporting surface of a gravity bending mould;
heating the at least one glass pane to at least its softening temperature;
producing an overpressure on a first surface of the at least one glass pane facing away from the supporting surface using an upper shaping tool that has a cover that forms a hollow space open in the direction of the gravity bending mould and comprises a flexible sealing lip disposed between the cover and the first surface and contacting the first surface, the flexible sealing lip comprising a first portion contacting an edge section of the cover on a side of the edge section facing the hollow space and a second portion, integral with the first portion, distanced and extending apart from the edge section of the cover towards a region interior to the hollow space for making contact with the first surface, the second portion containing a weighting belt, wherein the overpressure is produced by introducing a gas into the hollow space; and
cooling the glass pane.

13. The method according to claim 12, wherein, during bending, the sealing lip is arranged completely above the first surface of the at least one glass pane.

14. The method according to claim 12, wherein the edge section surrounds the at least one glass pane during bending and the sealing lip extends beyond a side edge of the glass pane.

15. The method according to claim 12, wherein the overpressure is from 5 mbar to 50 mbar.

16. The method according to claim 12, wherein the overpressure is produced for a period of at most 60 seconds on the first surface of the glass pane.

17. The method according to claim 12, wherein the glass pane contains soda lime glass and the maximum temperature to which the glass pane is heated is less than 630° C.

18. The method according to claim 17, wherein the maximum temperature to which the glass pane is heated is less than 620° C.

19. The method according to claim 12, wherein the overpressure is from 10 mbar to 30 mbar.

20. A method of using an upper shaping tool that has a cover that forms a hollow space open in the direction of the gravity bending mould and comprises a flexible sealing lip arranged on an edge section of the cover, for assisting a gravity bending process, wherein, with the upper shaping tool, an overpressure is produced on the first surface of a glass pane facing away from a gravity bending mould, by disposing the flexible sealing lip between the cover and a first surface of the glass pane, the flexible sealing lip comprising a first portion contacting the edge section of the cover on a side of the edge section facing the hollow space and a second portion, integral with the first portion, distanced and extending apart from the edge section of the cover towards a region interior to the hollow space for making contact with the first surface, the second portion containing a weighting belt, bringing the sealing lip into contact with the first surface and introducing a gas into the hollow space.

* * * * *